United States Patent
Ozcan et al.

(10) Patent No.: US 9,767,149 B2
(45) Date of Patent: Sep. 19, 2017

(54) JOINING DATA ACROSS A PARALLEL DATABASE AND A DISTRIBUTED PROCESSING SYSTEM

(71) Applicant: International Business Machines Corporation, Armonk, NY (US)

(72) Inventors: Fatma Ozcan, San Jose, CA (US); Hamid Pirahesh, San Jose, CA (US); Yuanyuan Tian, San Jose, CA (US); Tao Zou, Ithaca, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 428 days.

(21) Appl. No.: 14/511,345

(22) Filed: Oct. 10, 2014

(65) Prior Publication Data

US 2016/0103877 A1  Apr. 14, 2016

(51) Int. Cl.
  *G06F 17/30* (2006.01)
(52) U.S. Cl.
  CPC .. *G06F 17/30445* (2013.01); *G06F 17/30545* (2013.01)
(58) Field of Classification Search
  CPC .............. G06F 17/30445; G06F 17/30545
  See application file for complete search history.

(56) References Cited

U.S. PATENT DOCUMENTS

| | | | | |
|---|---|---|---|---|
| 5,806,059 | A | * | 9/1998 | Tsuchida ............ G06F 17/30445 |
| 6,081,801 | A | * | 6/2000 | Cochrane .......... G06F 17/30433 |
| 6,556,988 | B2 | * | 4/2003 | Tsuchida ............ G06F 17/30445 |

(Continued)

FOREIGN PATENT DOCUMENTS

| | | |
|---|---|---|
| WO | 2011092203 A1 | 8/2011 |
| WO | 2011153242 A1 | 12/2011 |

OTHER PUBLICATIONS

Spyros Blanas, Jignesh M. Patel, Vuk Ercegovac, Jun Rao, Eugene J. Shekita and Yuanyuan Tian, A Comparison of Join Algorithms for Log Processing in MapReduce, Feb. 10, 2006, SIGMOD '10 Proceedings of the 2010 ACM SIGMOD International Conference on Management of data.*

(Continued)

*Primary Examiner* — Rehana Perveen
*Assistant Examiner* — Alp Onat
(74) *Attorney, Agent, or Firm* — Cantor Colburn LLP; Bryan Butler

(57) ABSTRACT

Embodiments relate to joining data across a parallel database and a distributed processing system. Aspects include receiving a query on data stored in parallel database T and data stored in distributed processing system L, applying local query predicates and projection to data T to create T', and applying local query predicates and projection to L to create L'. Based on determining that a size of L' is less than a size of T' and that the size of L' is less than a first threshold, transmitting L' to the parallel database and executing a join between T' and L'. Based on determining that a number of the nodes distributed processing system n multiplied by the size of T' is less than the size of L' and that the size of T' is less than a second threshold; transmitting T' to the distributed processing system and executing a join between T' and L'.

20 Claims, 12 Drawing Sheets

(56) References Cited

U.S. PATENT DOCUMENTS

| | | | | |
|---|---|---|---|---|
| 6,804,678 | B1 * | 10/2004 | Luo | G06F 17/30445 |
| 7,054,852 | B1 * | 5/2006 | Cohen | G06F 17/30595 |
| 7,386,561 | B1 * | 6/2008 | Ramesh | G06F 17/30466 |
| 8,112,438 | B2 * | 2/2012 | Hattori | G06F 17/30445 707/764 |
| 8,150,836 | B2 * | 4/2012 | Xu | G06F 17/30445 706/12 |
| 8,386,469 | B2 * | 2/2013 | Reuther | G06F 17/30427 707/713 |
| 8,849,871 | B2 * | 9/2014 | Idicula | G06F 17/30498 707/803 |
| 9,372,892 | B1 * | 6/2016 | Chainani | G06F 17/30498 |
| 2001/0014888 | A1 * | 8/2001 | Tsuchida | G06F 17/30445 |
| 2004/0215639 | A1 * | 10/2004 | Bamford | G06F 9/5083 |
| 2005/0187977 | A1 | 8/2005 | Frost | |
| 2011/0302151 | A1 * | 12/2011 | Abadi | G06F 17/30445 707/714 |
| 2014/0280020 | A1 * | 9/2014 | Singamshetty | G06F 17/30445 707/714 |
| 2014/0280021 | A1 * | 9/2014 | Singamshetty | G06F 17/30442 707/714 |

OTHER PUBLICATIONS

Kyong-Ha Lee, Yoon-Joon Lee, Hyunsik Choi, Yon Dohn Chung and Bongki Moon, Parallel Data Processing with MapReduce: A Survey, Dec. 2011, ACM SIGMOD Record, vol. 40 Issue 4.*
IBM, "Implementing a Common Workload Management System in a Shared-Nothing RDBMS," IP.com No. IPCOM000131965D, Publication Date: Nov. 24, 2005, 3 pages.
IBM, "On-Line Data Redistribution in a Shared-Nothing Parallel Database System," IP.com No. IPCOM000118391D, Publication Date: Jan. 1, 1997, 5 pages.
IBM, Redistributing Data in Shared-Nothing Partitioned Database Environments Via Restore Mechanism, IP.com No. IPCOM000132342D, Publication Date: Dec. 8, 2005, 3 pages.
Moon et al., Parallel Hash Join Algorithms for Dynamic Load Balancing in a Shared Disks Cluster, AN-8957768, 2006, 10 pages.
Wong et al., "A parallel sort-balance range-join algorithm on hypercube computers," School of Computing and Informational Technology Griffith University, IEEE, 1997, 13 pages.

* cited by examiner

Algorithm 1: Consolidated Join Algorithm 1. apply local predicates and projections on each table in parallel: $T \to T'$ and $L \to L'$ ;
2. if $\|L'\| < \|T'\|$ *and* $\|L'\| < threshold_{hdfs}$ then //DB-side join w/o BF
3.     transfer $L'$ to parallel DB;
4.     join $L'$ with $T'$ on the parallel DB side;
5. else if $n \times \|T'\| < \|L'\|$ *and* $\|T'\| < threshold_{db}$ then //broadcast join
6.     broadcast $T'$ to HQPE nodes;
7.     join $T'$ with $L'$ on the HQPE side;
8. else
9.     sample join keys on $T'$ and $L'$;
10.     exchange the small samples between parallel DB and HQPE nodes;
11.     estimate join-key selectivities $\hat{S}_{L'}$ and $\hat{S}_{T'}$;
12.     if $\hat{S}_{L'} < thrs_{L'}(|T'|,|L'|,\|L'\|)$ then
13.         compute Bloom filter $BF_{T'}$ on $T'$;
14.         send $BF_{T'}$ to the HQPE nodes;
15.         apply $BF_{T'}$ on $L' \to L''$;
16.         if $\hat{S}_{T'} < thrs_{T'}(|L''|,|T'|,\|T'\|)$ then //Zig Zag join
17.             compute Bloom filter $BF_{L''}$ on $L''$;
18.             send $BF_{L''}$ to the database nodes;
19.             apply $BF_{L''}$ on $T' \to T''$;
20.             send $T''$ to HQPE nodes;
21.             join $T''$ with $L''$ on the HQPE side;
22.         else if $\|L''\| < \|T'\|$ *and* $\|L''\| < threshold_{hdfs}$ then //DB-side join w BF
23.             transfer $L''$ to parallel DB;
24.             join $L''$ with $T'$ on the parallel DB side;
25.         else //repartition join w BF
26.             send $T'$ to HQPE nodes;
27.             join $T'$ with $L''$ on the HQPE side;
28.     else //repartition join w/o BF
29.         send $T'$ to HQPE nodes;
30.         join $T'$ with $L'$ on the HQPE side;

FIG. 7

JOINING DATA ACROSS A PARALLEL DATABASE AND A DISTRIBUTED PROCESSING SYSTEM

BACKGROUND

Embodiments of the invention relate generally to joining data across computer systems with disparate file systems, and more specifically, to joining data across a parallel database and a distributed processing system.

Parallel databases have long been used by enterprises to manage and analyze their important data. In recent years, as the advent of the big data movement, Hadoop and related systems are increasingly being used for big data analytics in distributed clusters. In particular, the Hadoop Distributed File System (HDFS) serves as the core storage system where other distributed processing systems, such as MapReduce, Spark, Impala and Giraph, access and operate on the large volumes of data.

In general, parallel databases and Hadoop are two very different processing environments. First of all, parallel databases excel in SQL processing with decades of research and development in query optimization, whereas big data environment excels at scalable and more flexible data processing, but does little query optimization. In addition, while parallel databases use high-end or specialized hardware, Hadoop clusters usually consist of commodity hardware. Finally, parallel databases store and process critical structured data, like transactions, whereas Hadoop clusters are more suitable for semi-structured log data or unstructured text data.

Although different, the two environments are very complementary to each other. In fact, recently, there has been interest in combing data across both environments to create more business value for enterprises. One such example is to combine transaction data from parallel databases and user click log data from Hadoop to correlate customer online behavior with sales data for retailers.

BRIEF SUMMARY

Embodiments include a method, system, and computer program product for joining data across a parallel database and a distributed processing system. The method includes receiving a query on data stored across the parallel database T and the distributed processing system L, applying one or more local predicates $\sigma_T$ and projection based on the query to data stored on the parallel database T to create a filtered data T', and applying one or more local predicates $\sigma_L$ and projection based on the query to data stored on the distributed processing system L to create a filtered data L'. Based on determining that a size of L' is less than a size of T' and that the size of L' is less than a parallel database broadcast threshold, the method also includes one or more of the nodes of distributed processing system transmitting L' to the parallel database, and in response to receiving L', one or more nodes of the parallel database executing a join between T' and L'. Based on determining that a number of the nodes distributed processing system n multiplied by the size of T' is less than the size of L' and that the size of T' is less than a distributed files system transfer threshold; the method further includes one or more of parallel database nodes transmitting T' to the distributed processing system and in response to receiving T', one or more nodes of the distributed processing system executing a join between T' and L'.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

FIG. 7 depicts a consolidated join algorithm in accordance with an embodiment.

DETAILED DESCRIPTION

Embodiments described herein are directed to methods, systems and computer program products for performing a join across parallel databases and distributed processing systems. In exemplary embodiments, a number of join algorithms across a parallel databases and distributed processing systems, which may use file systems such as HDFS, are designed to leverage the processing power of both processing environments and minimize data movement between the two environments.

Figure 1:
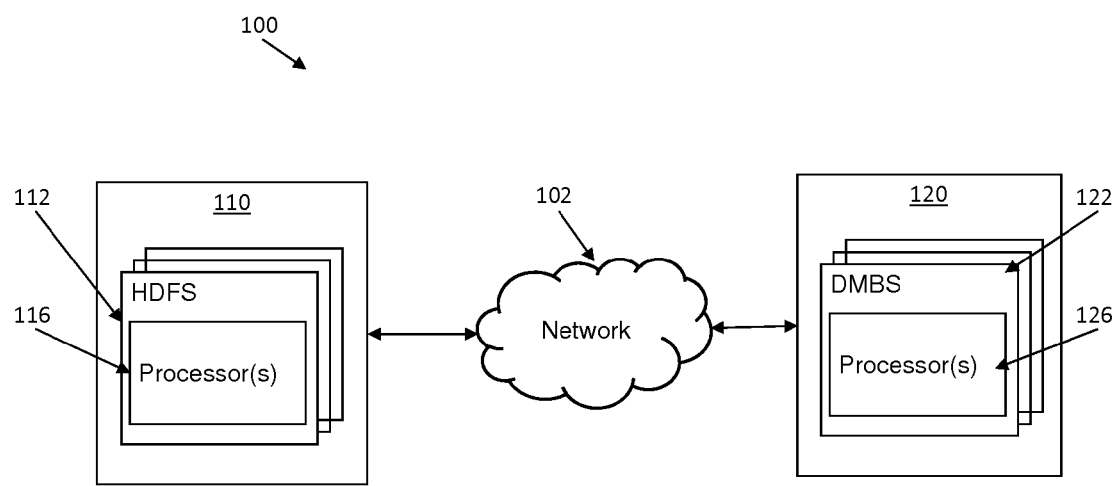
FIG. 1 depicts a block diagram of a system for joining data across a parallel database and a distributed processing system in accordance with an embodiment.

Referring now to FIG. 1, a block diagram of a system 100 for joining data across a parallel database and a distributed processing system in accordance with an embodiment is shown. As illustrated, the system 100 includes a first computer system 110 and a second computer system 120 which are in communication over a network 102. In exemplary embodiments, the second computer system 120 is separate from the first computer system and both of the computer systems are shared nothing systems, and they do not share access to any common data storage facility. In addition, there is no shared data within each independent system, nor across the two systems. In exemplary embodiments, the first computer system 110 is a distributed processing system, such as a Hadoop based platform that utilizes a distributed file system, such as HDFS, and the second computer system 120 includes a parallel database.

In one embodiment, an application, such as a database query or join, that requires access to data from "views" over multiple sources, including both the first computer system 110 and the second computer system 120 (i.e. data required from the other system is not stored raw, but the result of a computation) for the purpose of analytics is being executed on the first computer system 110. As a result, the application on the first computer system 110 requires data stored on the second computer system 120. In one embodiment, the first computer system 110 includes a multi-node Hadoop system having a plurality of HDFS nodes 112 and the second computer system 120 includes a parallel database system having a plurality of DBMS nodes 122, such as DB2 with a Data Partitioning Feature (DPF). In one embodiment, operational data required by an application may be contained in a HDFS node 112 of the first computer system 110 and transactional data required by an application may be contained in the DMBS node 122 of the second computer system 120. For example, an application on the first computer system 110 may perform order fulfillment process. In this case, the application needs access to both order data stored in the storage 112 of the first computer system 110 and to customer data that is stored in the DMBS node 122 residing on the second computer system 120. Current systems address this problem by pulling all of the data required for the computation (i.e. order and customer data) from the second computer system 120 to the first computer system 110. However, this approach can be prohibitively expensive for large datasets. In exemplary embodiments, each of the HDFS nodes 112 and the DMBS nodes 122 includes a processor 116, 126, respectively.

For example, a retailer that sells products in local stores as well as online may store all transaction data, from both offline and online sales, in a parallel database 120. In addition, the retailer may capture and store users' online click logs in a Hadoop HDFS system 110. To correlate customer online behavior with sales, the transaction data (abbreviated as T) in the a parallel database 120 needs to be joined with the log data (abbreviated as L) in a Hadoop HDFS system 110, i.e. T⋈L. In exemplary embodiments, T does not have to be a single table in the parallel database 120, it can be the result of a star join between a fact table and a few dimension tables. Since in reality log data is normally much larger than transaction data, it can be assumed that |T|<|L|, where |R| denotes the cardinality of dataset R (i.e. number of records in R). Besides the join operations, it is assumed that there are both local predicates on T and L, which are denoted as $\sigma_T$ and $\sigma_L$, respectively. In exemplary embodiments, joins are often coupled with other predicates on the joined result, group by and aggregate operations.

In one embodiment, a query for determining the number of views of the URLs visited by customers with IP addresses from east coast who bought a camera within one day of their online visits includes:

SELECT L.url pre_x, COUNT(*)
FROM T, L
WHERE T.category="Camera"
AND region(L.ip)="East Coast"
AND T.uid=L.uid
AND T.date>L.date AND T.date<L.date+1
GROUP BY L.url pre_x.

In exemplary embodiments, the second computing system 120 includes a small number (10s to 100s) of DMBS nodes 122 that are each disposed on a high-end server and the first computer system 110 includes a large number (100s to 1000s) of HDFS nodes 112 that are each disposed on a commodity machine. The second computing system 120 is a full-fledged parallel database and includes an optimizer, indexing support and sophisticated SQL engine. The first computing system 110 only supports general-purpose distributed data processing engines, such as MapReduce, Spark and Impala, which are all scan-based, with no indexing support. As used herein, any scan-based distributed data processing engine on HDFS node 112 is generalized as a HQPE (HDFS Query Processing Engine) node. In exemplary embodiments, the query is issued by the second computer system 120 and the final results are also to be returned at second computer system 120.

In exemplary embodiments, if the predicate $\sigma_T$ on T is highly selective (a small number of records remain after the predicate) the filtered transaction data $\sigma_T(T)$ is small enough to be sent to every processing node of the distributed processing system, referred to herein as a HQPE node. As a result, only local joins between $\sigma_T(T) \bowtie \sigma_L(L_i)$ are needed without any shuffling of data in L. As used herein, $L_i$ is the local portion of L on the $i^{th}$ HQPE node. As used herein the selectivity of a predicate $\sigma$ on R is defined as $$\text{sel}_\sigma = \frac{|\sigma(R)|}{|R|}.$$

Figure 2A:
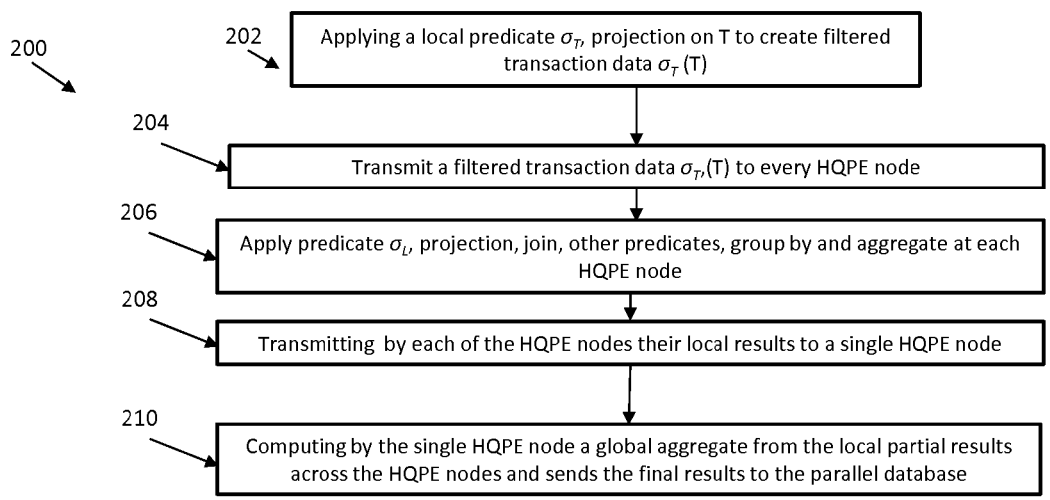
FIG. 2A depicts a process flow depicting a broadcast join method for performing a join across a parallel database and a distributed processing system in accordance with an embodiment.

Referring now to FIG. 2A, a process flow depicting a broadcast join method 200 for performing a join across a parallel database and distributed processing system in accordance with an embodiment is shown. As shown at block 202, the broadcast join method 200 includes applying local predicates $\sigma_T$ on T to create filtered transaction data $\sigma_T(T)$. Next, as shown at block 204, the broadcast join method 200 includes transmitting the filtered transaction data $\sigma_T(T)$ to every HQPE node. In exemplary embodiments, each parallel database node may only send its filtered transaction data to one HQPE node, which in turn forwards the filtered transaction data $\sigma_T(T)$ to every other HQPE node. By only transmitting the filtered transaction data $\sigma_T(T)$ once between the parallel database and distributed processing system, the data transfer across the two environments can be minimized. Next, as shown at block 206, each HQPE node applies predicate $\sigma_L$, join, other predicates, group by and aggregate to create a set of local results for each HQPE node. As shown at block 208, the broadcast join method 200 also includes transmitting by each of the HQPE nodes their set of local results to a designated HQPE node. Next, as shown at block 210 the designated HQPE node computes a global set of results from the sets of local results from each of the HQPE nodes and transmits the global set of results to the parallel database.

Figure 2B:
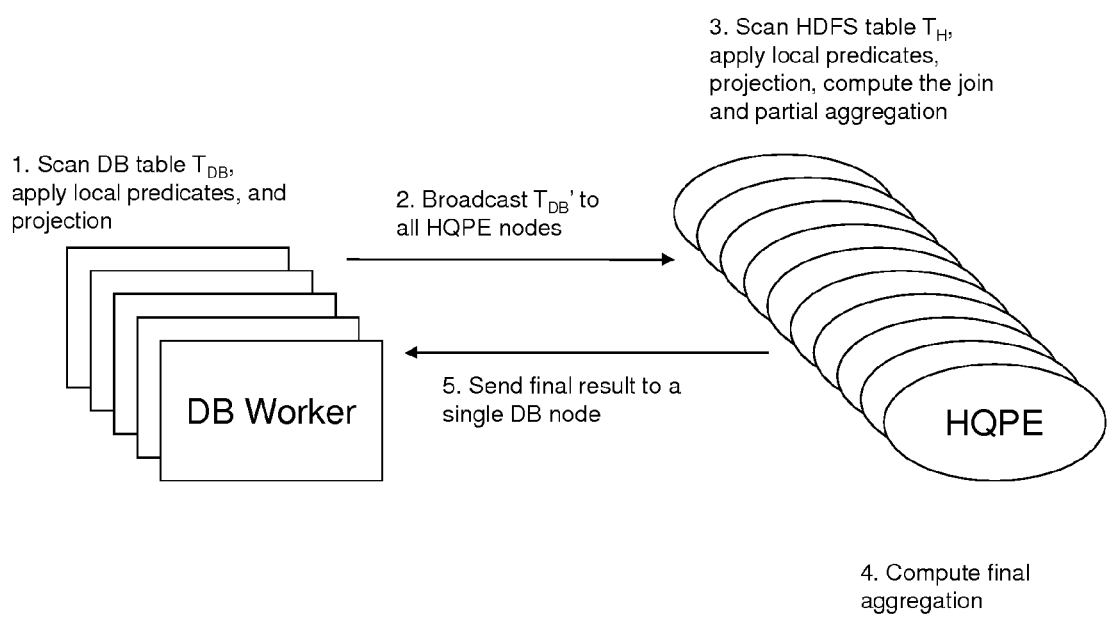
FIG. 2B depicts a data flow of the broadcast join method for performing a join across a parallel database and a distributed processing system in accordance with an embodiment.

FIG. 2B depicts a data flow of a broadcast join method for performing a join across a parallel database and a distributed processing system in accordance with an embodiment. The broadcast join algorithm depicted in the data flow shown in FIG. 2B is below:

Algorithm: Broadcast Join
1: (DB Local) Apply local predicate $\sigma_T$ & projection to filter out irrelevant fields
2: (DB→HQPE) Each Parallel DB node sends its data to one HQPE node
3: (HQPE→HQPE) Each HQPE node broadcasts its received data to all other HQPE nodes
4: (HQPE Local) Apply predicate $\sigma_L$, projection, join, other predicates, group by & aggregate locally
5: (HQPE→HQPE) One HQPE node receives from others and computes global aggregates
6: (HQPE→DB) The HQPE node with the final results sends to a single Parallel DB node In exemplary embodiments, if the predicate $\sigma_L$ on L is highly selective, the filtered log data can be copied to the parallel database to perform the final join, which is referred to as a DB-side join. In exemplary embodiments, L is usually much larger than T and even if $\sigma_L$ is highly selective, $\sigma_L(L)$ can still be large. In exemplary embodiments, in order to further reduce the amount of data transfer from the parallel database to the distributed processing system, the DB-side join method includes computing a bloom filter of T and using it to further filter out L records that cannot be joined. In general, a bloom filter is a space-efficient data structure used to test whether a value is in a set with controllable false positive rate.

Figure 3A:
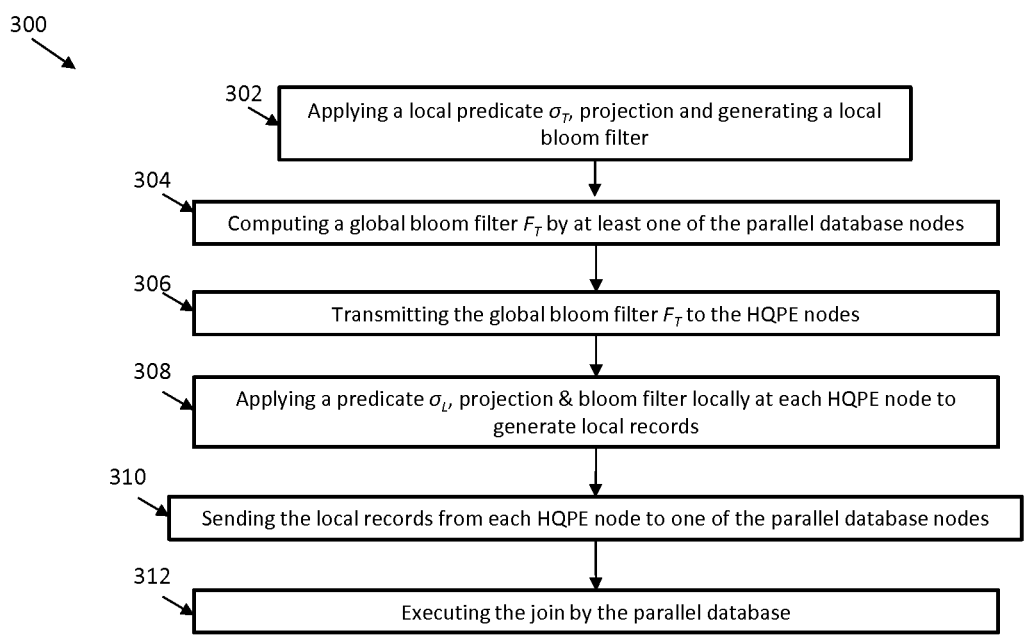
FIG. 3A depicts a process flow depicting a DB-side join method for performing a join across a parallel database and a distributed processing system in accordance with an embodiment.

Referring now to FIG. 3A, a process flow depicting a DB-side join method 300 for performing a join across a parallel database and distributed processing system in accordance with an embodiment is shown. As shown at block 302, the DB-side join method 300 includes applying a local predicate $\sigma T$, projecting and generating a local bloom filter. The DB-side join method 300 also includes computing a global bloom filter FT, as shown at block 304. Next, as shown at block 306, the DB-side join method 300 includes transmitting the global bloom filter FT to at least one of the HQPE nodes. In exemplary embodiments, each parallel database node can multicast the global bloom filter FT to a subset of the HQPE nodes, which together cover all the HQPE nodes.

Continuing with reference to FIG. 3A, as shown at block 308, the DB-side join method 300 includes applying a predicate $\sigma L$, projection and the global bloom filter FT locally at each HQPE node to generate local records. Next, as shown at block 310, the DB-side join method 300 includes sending the local records from each HQPE node to the parallel database nodes based on the hash partitioning function in the parallel database. The DB-side join method 300 also includes executing the reparation-based join by the parallel database, as shown at block 312.

Figure 3B:
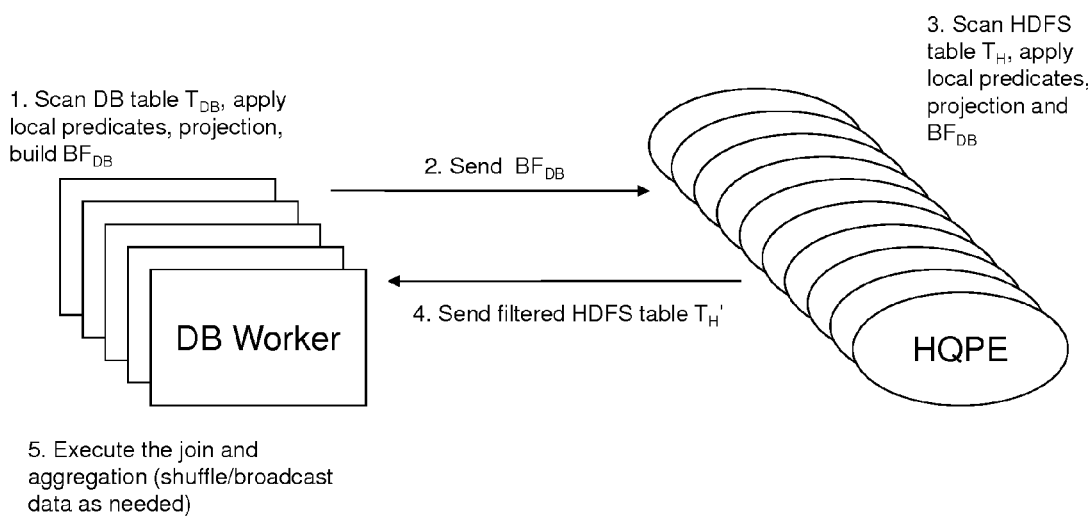
FIG. 3B depicts a data flow of the DB-side join method for performing a join across a parallel database and distributed processing system in accordance with an embodiment.

FIG. 3B depicts a data flow of a DB-side join method for performing a join across a parallel database and a distributed processing system in accordance with an embodiment. An example of the DB-side join algorithm shown in FIG. 3B is below:

Algorithm: DB-Side Join
1: (DB Local) Apply local predicate $\sigma_T$ & projection, generate local bloom filter
2: (DB→DB) Combine local bloom filter into global bloom filter $F_T$
3: (DB→HQPE) Parallel DB nodes multicast $F_T$ to HQPE nodes
4: (HQPE Local) Apply predicate $\sigma_L$, projection and global bloom filter $F_T$
5: (HQPE→DB) Send remaining records to Parallel DB through previous multicast channels
6: (DB Local) & (DB→DB) execute the join, other predicates, group by & aggregate In exemplary embodiments, when neither $\sigma_T$ nor $\sigma_L$ is highly selective, a selectivity of a join can be used to perform the join efficiently. As used herein, the selectivity of a join between R and S is defined as $$sel_{\bowtie} = \frac{|R \bowtie S|}{|R| \times |S|}.$$

When the join selectivity is high, only small portions of the T and L can be joined. In this case, bloom filters are applied on both sides to filter out irrelevant records, this method is referred to as a zig-zag join In a zig zag join, the final join happens on the HDFS side and both sides agree on a hash function h( ) to send data to a designated HQPE node for the final join.

Figure 4A:
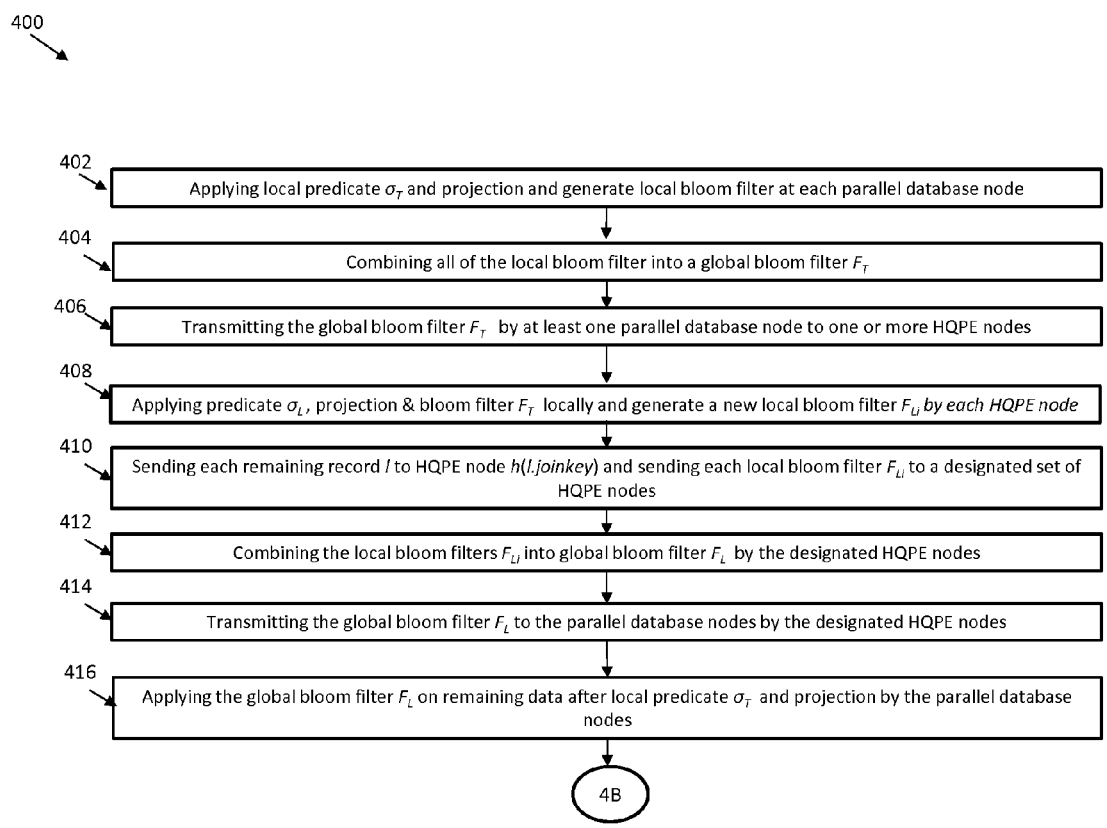
FIGS. 4A and 4B depict a process flow depicting a zig zag join method for performing a join across a parallel database and a distributed processing system in accordance with an embodiment.
Figure 4B:
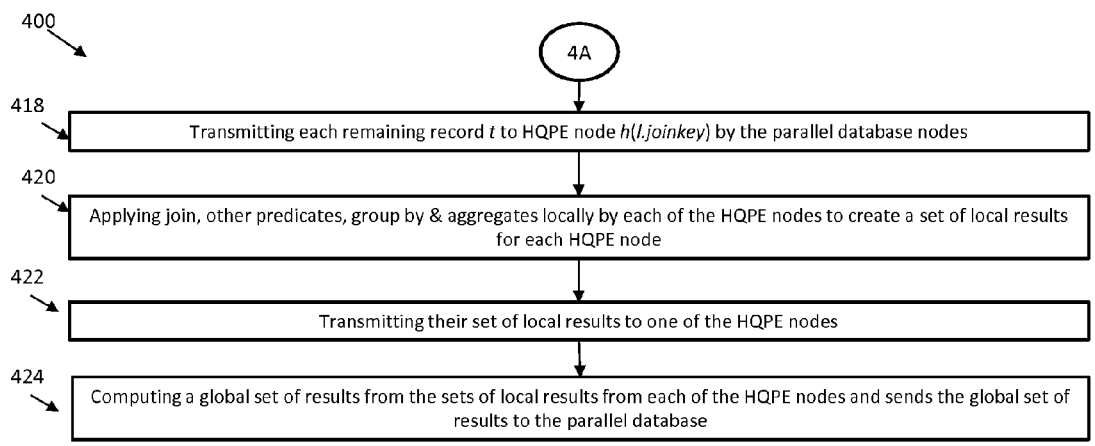

Referring now to FIGS. 4A and 4B, a process flow depicting a zig zag join method 400 for performing a join across a parallel database and a distributed processing system in accordance with an embodiment is shown. As shown at block 402, the zig zag join method 400 includes applying local predicate $\sigma T$ and projection and generate local bloom filter at each parallel database node. The zig zag join method 400 also includes combining all of the local bloom filter into a global bloom filter FT, as shown at block 404. The zig zag join method 400 also includes transmitting the global bloom filter FT by at least one parallel database node to one or more HQPE nodes, as shown at block 406. Next, as shown at block 408, the zig zag join method 400 includes applying predicate $\sigma_L$, projection and the global bloom filter FT locally and generate a new local bloom filter FLi by each HQPE node. The zig zag join method 400 also includes sending each remaining record l to HQPE node h(l.joinkey) and sending each local bloom filter FLi to a designated set of HQPE nodes, as shown at block 410. Next, as shown at block 412, the zig zag join method 400 includes combining the local bloom filters FLi into global bloom filter FL by the designated HQPE nodes. The zig zag join method 400 also includes transmitting the global bloom filter FL to the parallel database nodes by the designated HQPE nodes, as shown at block 414. Next, as shown at block 416, the zig zag join method 400 includes applying the global bloom filter FL on remaining data after local predicate $\sigma T$ and projection by each of the parallel database nodes, which results in remaining records t.

Continuing with reference to FIG. 4B, the zig zag join method 400 also includes transmitting each remaining record t to HQPE node h(l.joinkey) by the parallel database nodes, as shown at block 418. The zig zag join method 400 also includes applying join, other predicates, group by & aggregates locally by each of the HQPE nodes to create a set of local results for each HQPE node, as shown at block 420. Next, as shown at block 422, the zig zag join method 400 includes each of the HQPE nodes transmitting their set of local results to one of the HQPE nodes. The zig zag join method 400 also includes the HQPE node computes a global set of results from the sets of local results from each of the HQPE nodes and sends the global set of results to the parallel database, as shown at block 424.

Figure 4C:
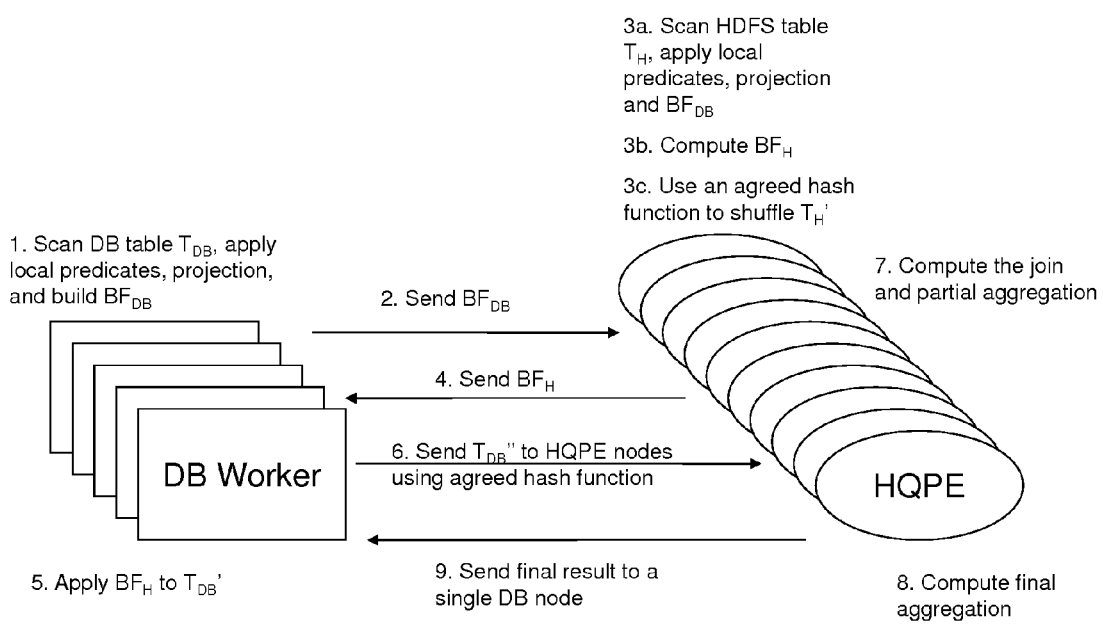
FIG. 4C depicts a data flow of the zig zag join method for performing a join across a parallel database and a distributed processing system in accordance with an embodiment.

FIG. 4C depicts a data flow of a zig zag join method for performing a join across a parallel database and a distributed processing system in accordance with an embodiment. An example of the zig zag join algorithm shown in FIG. 4C is below:

Algorithm: Zig Zag Join
1: (DB Local) Apply local predicate $\sigma_T$ projection and generate local bloom filter
2: (DB→DB) Combine local bloom filter into global bloom filter $F_T$
3: (DB→HQPE) Parallel DB nodes multicast $F_T$ to HQPE nodes
4: (HQPE Local) Apply predicate $\sigma_L$, projection & bloom filter $F_T$ locally and generate a new local bloom filter $F_L$,
5.1: (HQPE→HQPE) For each remaining record l, send it to HQPE node h(l.joinkey)
5.2: (HQPE→HQPE) Each HQPE node sends local bloom filter $F_{Li}$ to a designated set of HQPE nodes
6: (HQPE Local) The designated HQPE nodes combine local bloom filters $F_{Li}$ into global bloom filter $F_L$
7: (HQPE→DB) The designated HQPE nodes multicast $F_L$ to parallel database nodes
8: (DB Local) apply $F_L$ on remaining data (after local predicate & projection)
9: (DB→HQPE) For each remaining record t, send it to HQPE node h(t.joinkey)
10: (HQPE Local) Apply join, other predicates, group by and aggregates locally
11: (HQPE→HQPE) One HQPE node receives from others and computes global aggregates
12: (HQPE→DB) The HQPE node with final results sends to a single parallel database node In exemplary embodiments, when none of the predicate selectivities or join selectivity is high, a repartition join algorithm is used to perform the join. Since L is much larger than T in practice, it makes more sense to move the smaller T from the parallel database to HDFS and execute the final join at the HDFS side. In exemplary embodiments, the repartition join algorithm requires both sides to agree on the hash function h( ) to send data to a designated HQPE node for the final join. In exemplary embodiments, besides sending the filtered data in T to HDFS, the repartition join algorithm also sends a bloom filter to the HQPE nodes because the bloom filter can help reduce the amount of data in L that needs to be transmitted for the final join. Since that bloom filter is much smaller in size than the actual data, the cost of transmitting the bloom filter is often negligible, and is significantly outweighed by benefit.

Figure 5A:
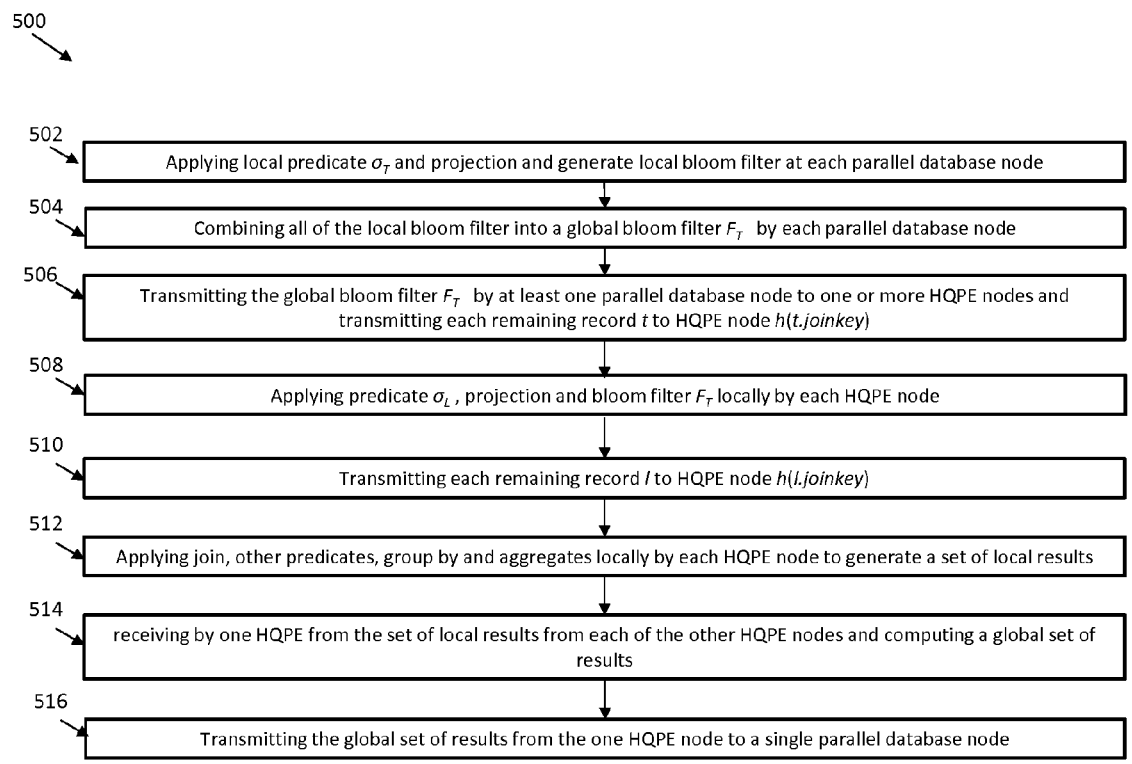
FIG. 5A depicts a process flow depicting a repartition join method for performing a join across a parallel database and a distributed processing system in accordance with an embodiment.

Referring now to FIG. 5A, a process flow depicting a repartition join method 500 for performing a join across a parallel database and distributed processing system in accordance with an embodiment is shown. As shown at block 502, the repartition join method 500 includes applying local predicate $\sigma_T$, projection and generating a local bloom filter and remaining records t at each parallel database node. The repartition join method 500 also includes combining the local bloom filters into a global bloom filter $F_T$, as shown at block 504. Next, as shown at block 506, the repartition join method 500 includes transmitting by each parallel database node the global bloom filter $F_T$ to at least one HQPE node and transmitting each remaining record t to HQPE node h(t.joinkey). The repartition join method 500 also includes applying predicate $\sigma_L$ projection and bloom filter FT locally by each HQPE node which results in remaining records l, as shown at block 508. Next, as shown at block 510, the repartition join method includes transmitting each remaining record l to HQPE node h(l.joinkey). The repartition join method 500 also includes applying join, other predicates, group by and aggregates locally by each HQPE node to generate a set of local results, as shown at block 512. Next, as shown at block 514, the repartition join method 500 includes receiving by one HQPE from the set of local results from each of the other HQPE nodes and computing a global set of results. The repartition join method 500 also includes transmitting the global set of results from the one HQPE node to a single parallel database node, as shown at block 516.

Figure 5B:
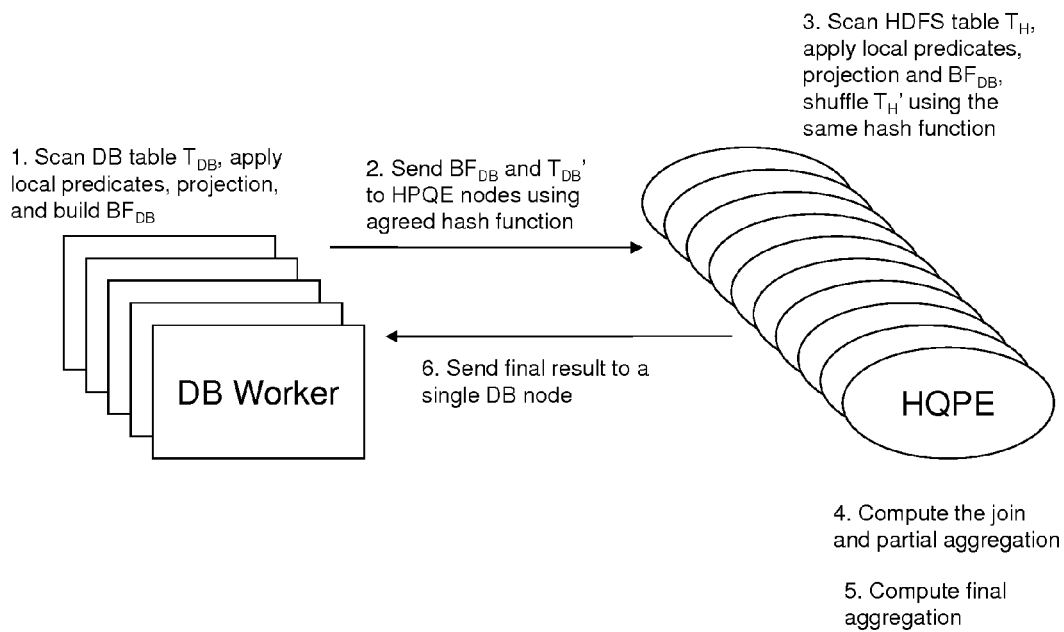
FIG. 5B depicts a data flow of the repartition join method for performing a join across a parallel database and a distributed processing system in accordance with an embodiment.

FIG. 5B depicts a data flow of a repartition join method for performing a join across a parallel database and a distributed processing system in accordance with an embodiment. An example of the repartition join algorithm shown in FIG. 5B is below:

Algorithm: Repartition Join
1: (DB Local) Apply local predicate $\sigma_T$, projection and generate local bloom filter
2: (DB→DB) Combine local bloom filter into global bloom filter $F_T$
3.1: (DB→HQPE) Parallel DB nodes multicast $F_T$ to HQPE nodes
3.2: (DB→HQPE) For each remaining record t, send it to HQPE node h(t.joinkey)
4: (HQPE Local) Apply predicate $\sigma_L$ projection and global bloom filter $F_T$ locally
5: (HQPE→HQPE) For each remaining record l, send it to HQPE node h(l.joinkey)
6: (HQPE Local) Apply join, other predicates, group by and aggregates locally
7: (HQPE→HQPE) One HQPE node receives from others and computes global aggregates
8: (HQPE→DB) The HQPE node with the final results sends to a single parallel database node In exemplary embodiments, a consolidated method for performing a join across a parallel database and a distributed processing system in accordance with an embodiment is provided. The consolidated method includes applying local predicates $\sigma_T$ and projection on T to create filtered transaction data, referred as T', and $\sigma_L$ on L to create filtered log data, referred to as L'.

In an exemplary embodiment, after the local predicates and projection, JK(T') is the set of join keys in T', and JK(L') is the set of join keys in L'. Since only the join keys in JK(T')∩JK(L') will appear in the final join result, only $$\frac{JK(T') \cap JK(L')}{JK(L')}$$

fraction of join keys in L' will participate in the join. This fraction is referred to as the join-key selectivity on L', denoted as $S_{L'}$. Likewise, the join-key selectivity on T' is $$S_{T'} = \frac{JK(T') \cap JK(L')}{JK(T')}.$$

Considering Bloom filters with the same false positive rate, naturally the smaller $S_{L'}$ is, the better a Bloom filter built on T' is at pruning the non-joinable records in L'. The same also applies to $S_{T'}$.

In exemplary embodiments, a consolidated join algorithm may be used to join tables T and L. The consolidated algorithm is shown in FIG. 7.

As used herein ||R|| is the actual size of a table R in bytes, |R| is the number of records in a table R, n is the number of HQPE nodes, T is the table in parallel database, L is the table on HDFS, T' is the table after applying local predicates and projection on T, L' is the table after applying local predicates and projection on L, $BF_{T'}$ is the Bloom filter built on the join key of table T', L" is the table after applying $BF_{T'}$ on L', $BF_{L''}$ is the Bloom filter built on the join key of table L", T" is the table after applying $BF_{L''}$ on T', $S_{T'}$ is the join-key selectivity on T' and $S_{L'}$ is the join-key selectivity on L'.

As used herein, a parallel database broadcast threshold, $threshold_{db}$, is the threshold to broadcast the database data to HQPE nodes. This parameter can be pre-set by the system based on the system configurations, such as the network bandwidth between the parallel database and the HDFS cluster (denoted as $b_{cross}$) and the number of HQPE nodes (denoted as n). For example, let x denote the size of database data you want to broadcast to HQPE nodes, then n×x will be actually transferred through the interconnection network. In order to limit the time to be $<t_1$ to broadcast the database data, then $$x < \frac{b_{cross} \times t_1}{n},$$

set $$threshold_{db} = \frac{b_{cross} \times t_1}{n}.$$

As used herein, a distributed files system transfer threshold, $threshold_{hdfs}$ is the threshold to transfer the HDFS data to database nodes. This parameter can be pre-set by the system based on the system configurations, such as the network bandwidth between the parallel database and the HDFS cluster (denoted as $b_{cross}$). For example, let y denote the size of HDFS data you want to transfer to database nodes. In order to limit the time to be $<t_2$ to transfer the HDFS data, then $y<b_{cross} \times t_2$, set $threshold_{hdfs}=b_{cross} \times t_2$.

As used herein a first threshold function, $thr_{S_{L'}}(i,j,x)$, is the threshold function of $S_{L'}$ to make it worthwhile to compute a Bloom filter on T' denoted as $BF_{T'}$, send and apply the Bloom filter on L'. This function takes in three parameters. i is the number of records in T'. j is the number of records in L'. x is the size of the table L' in bytes. This function can be pre-set by the system based on the overhead of the Bloom filter and the time it saves in shuffling the HDFS data. For example, this is how we can set this function. Since Bloom filter is very small, the cost of transmitting it across the interconnection can be ignored. The cost of adding the join key into the Bloom filter representation for each record in T' is $c_{put}$ and the cost of checking the join key against the Bloom filter for each record in L' is $c_{check}$. The overhead of the Bloom filter is $i \times c_{put} + j \times c_{check}$. The Bloom filter is estimated to avoid shuffling $(1-S_{L'}) \times x$ amount of data. Let $b_{hdfs}$ to be the shuffling bandwidth among the HQPE nodes. Then the time it saves for shuffling is $$\frac{(1-s_{L'}) \times x}{b_{hdfs}}.$$

For the Bloom filter to be worthwhile, $$i \times c_{put} + j \times c_{check} < \frac{(1-s_{L'})mesx}{b_{hdfs}},$$

which means $$S_{L'} < 1 - \frac{i \times c_{put} \times b_{hdfs} + j \times c_{check} \times b_{hdfs}}{x}.$$

So, $thr_{S_L}(i,j,x)$ can be defined as $$1 - \frac{i \times c_{put} \times b_{hdfs} + j \times c_{check} \times b_{hdfs}}{x}.$$

As used herein a second threshold function, $thr_{S_{T'}}(i,j,x)$, is the threshold function of $S_{T'}$ to make it worthwhile to compute a Bloom filter on L" denoted as $BF_{L''}$, send and apply the Bloom filter on T'. This function takes in three parameters. i is the number of records in L". j is the number of records in T'. x is the size of the table T' in bytes. This function can be pre-set by the system based on the overhead of the Bloom filter and the time it saves in sending the DB data to HDFS. For example, this is how we can set this function. Since Bloom filter is very small, the cost of transmitting it across the interconnection can be ignored. The cost of adding the join key into the Bloom filter representation for each record in T' is $c_{put}$ and the cost of checking the join key against the Bloom filter for each record in L' is $c_{check}$. The overhead of the Bloom filter is $i \times c_{put} + j \times c_{check}$. The Bloom filter is estimated to avoid sending $(1-S_{T'}) \times x$ amount of data. Let $b_{cross}$ to be network bandwidth between the parallel DB and HQPE nodes. The time it saves for sending data is $$\frac{(1-S_{T'}) \times x}{b_{cross}}.$$

For the Bloom filter to be worthwhile, $$i \times c_{put} + j \times c_{check} < \frac{(1-S_{T'}) \times x}{b_{cross}},$$

which means $$S_{T'} < 1 - \frac{i \times c_{put} \times b_{cross} + j \times c_{check} \times b_{cross}}{x}.$$

So, $thr_{S_T}(i,j,x)$ can be defined as $$1 - \frac{i \times c_{put} \times b_{cross} + j \times c_{check} \times b_{cross}}{x}.$$

It will be appreciated by those of ordinary skill in the art that although all the individual algorithms and the consolidated algorithm start from the parallel database side, for each of them, there is a corresponding algorithm that starts from the HDFS side.

Figure 6:
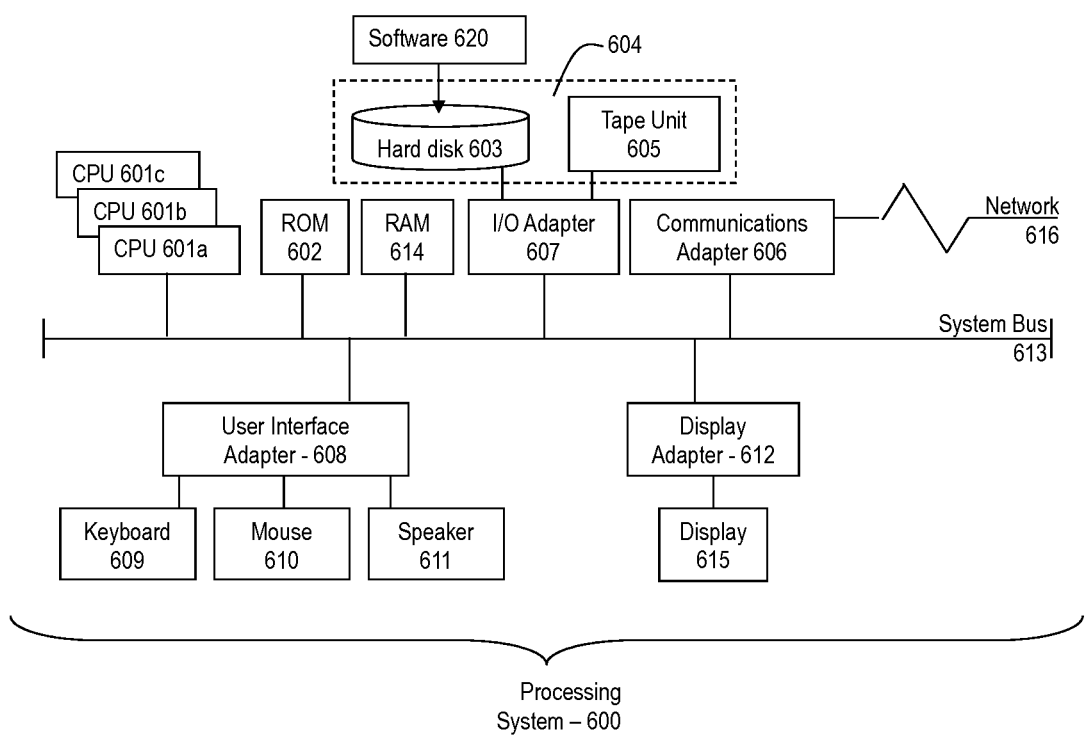
FIG. 6 depicts a processing system for practicing the teachings herein in accordance with an embodiment.

Referring to FIG. 6, there is shown an embodiment of a processing system 600 for implementing the teachings herein. In this embodiment, the system 600 has one or more central processing units (processors) 601a, 601b, 601c, etc. (collectively or generically referred to as processor(s) 601).

In one embodiment, each processor 601 may include a reduced instruction set computer (RISC) microprocessor. Processors 601 are coupled to system memory 614 and various other components via a system bus 613. Read only memory (ROM) 602 is coupled to the system bus 613 and may include a basic input/output system (BIOS), which controls certain basic functions of system 600.

FIG. 6 further depicts an input/output (I/O) adapter 607 and a network adapter 606 coupled to the system bus 613. I/O adapter 607 may be a small computer system interface (SCSI) adapter that communicates with a hard disk 603 and/or tape storage drive 605 or any other similar component. I/O adapter 607, hard disk 603, and tape storage device 605 are collectively referred to herein as mass storage 604. Software 620 for execution on the processing system 600 may be stored in mass storage 604. A network adapter 606 interconnects bus 613 with an outside network 616 enabling data processing system 600 to communicate with other such systems. A screen (e.g., a display monitor) 615 is connected to system bus 613 by display adaptor 612, which may include a graphics adapter to improve the performance of graphics intensive applications and a video controller. In one embodiment, adapters 607, 606, and 612 may be connected to one or more I/O busses that are connected to system bus 613 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 613 via user interface adapter 608 and display adapter 612. A keyboard 609, mouse 610, and speaker 611 all interconnected to bus 613 via user interface adapter 608, which may include, for example, a Super I/O chip integrating multiple device adapters into a single integrated circuit.

Thus, as configured in FIG. 6, the system 600 includes processing capability in the form of processors 601, storage capability including system memory 614 and mass storage 604, input means such as keyboard 609 and mouse 160, and output capability including speaker 611 and display 615. In one embodiment, a portion of system memory 614 and mass storage 604 collectively store an operating system such as the AIX® operating system from IBM Corporation to coordinate the functions of the various components shown in FIG. 6.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for joining data across a parallel database and a distributed processing system comprising:
    receiving a query on data stored in the parallel database T and data stored in the distributed processing system L;
    applying local projection and one or more local predicates $\sigma_T$ based on the query to data stored on the parallel database T to create a filtered data T';
    applying local projection and one or more local predicates $\sigma_L$ based on the query to data stored on the distributed processing system L to create a filtered data L';
    based on determining that a size of L' is less than a size of T' and that the size of L' is less than a parallel database broadcast threshold, one or more of the nodes of distributed processing system transmitting L' to the parallel database, and in response to receiving L', one or more nodes of the parallel database executing a join between T' and L'; and
    based on determining that a number of the nodes of distributed processing system n multiplied by the size of T' is less than the size of L' and that the size of T' is less than a distributed files system transfer threshold, one or more of parallel database nodes transmitting T' to the distributed processing system and in response to receiving T', one or more nodes of the distributed processing system executing a join between T' and L'.

2. The method of claim 1, further comprising:
    estimating a join-key selectivity $S_{L'}$ of the filtered data L' and a join-key selectivity $S_{T'}$ of the filtered data T';
    based on determining that the estimated join-key selectivity $S_{L'}$ of the filtered data L' is less than a first threshold function based on a number of records in T', a number of records in L' and the size of L';
    computing a bloom filter $BF_{T'}$ on the filtered data T';
    transmitting the bloom filter $BF_{T'}$ to at least one of a plurality of distributed processing system nodes;
    applying the bloom filter $BF_{T'}$ on L' to create a set of results L".

3. The method of claim 2 further comprising:
    based on determining that the estimated join-key selectivity $S_{T'}$ of the filtered data T' is less than a second threshold function based on a number of records in L", the number of records in T' and the size of T':
        computing a bloom filter $BF_{L'}$ on the set of results L";
        transmitting the bloom filter $BF_{L'}$ to at least one of a plurality of parallel database nodes;
        applying the global bloom filter $BF_{L'}$ on T' to create a set of results T";
        transmitting T" to at least one of the plurality of distributed processing system nodes and executing a join between T" and L".

4. The method of claim 2, further comprising:
    based on determining that the size of L" is less than the size of T' and that the size of L" is less than the parallel database broadcast threshold, transmitting L" to at least one of a plurality of parallel database nodes and executing a join between T' and L".

5. The method of claim 2, further comprising transmitting T' to at least one of a plurality of distributed processing system nodes and executing a join between T' and L".

6. The method of claim 2, further comprising:
    based on determining that the estimated join-key selectivity $S_{L'}$ of the filtered data L' is not less than a first threshold function based on a number of records in T', a number of records in L' and the size of L':
        transmitting T' to at least one of a plurality of distributed processing system nodes and executing a join between T' and L'.

7. The method of claim 1, wherein the distributed processing system is a Hadoop big data platform having one of a distributed file system and a shared file system.

8. A computer program product for joining data across a parallel database and a distributed processing system, the computer program product comprising:

a non-transitory tangible storage medium readable by a processing circuit and storing instructions for execution by the processing circuit for performing a method comprising:

receiving a query on data stored in the parallel database T and data stored in the distributed processing system L;

applying local projection and one or more local predicates $\sigma_T$ based on the query to data stored on the parallel database T to create a filtered data T';

applying local projection and one or more local predicates $\sigma_L$ based on the query to data stored on the distributed processing system L to create a filtered data L';

based on determining that a size of L' is less than a size of T' and that the size of L' is less than a parallel database broadcast threshold, one or more of the nodes distributed processing system transmitting L' to the parallel database, and in response to receiving L', one or more nodes of the parallel database executing a join between T' and L'; and based on determining that a number of the nodes of distributed processing system n multiplied by the size of T' is less than the size of L' and that the size of T' is less than a distributed files system transfer threshold one or more of parallel database nodes transmitting T' to the distributed processing system and in response to receiving T', one or more nodes of the distributed processing system executing a join between T' and L'.

9. The computer program product of claim 8, further comprising:

estimating a join-key selectivity $S_{L'}$ of the filtered data L' and a join-key selectivity $S_{T'}$ of the filtered data T';

based on determining that the estimated join-key selectivity $S_{L'}$ of the filtered data L' is less than a first threshold function based on a number of records in T', a number of records in L' and the size of L':

computing a bloom filter $BF_{T'}$ on the filtered data T';

transmitting the bloom filter $BF_{T'}$ to at least one of a plurality of distributed processing system nodes;

applying the bloom filter $BF_{T'}$ on L' to create a set of results L".

10. The computer program product of claim 9, further comprising:

based on determining that the estimated join-key selectivity $S_{T'}$ of the filtered data T' is less than a second threshold function based on a number of records in L", the number of records in T' and the size of T':

computing a bloom filter $BF_{L'}$ on the set of results L";

transmitting the bloom filter $BF_{L'}$ to at least one of a plurality of parallel database nodes;

applying the global bloom filter $BF_{L'}$ on T' to create a set of results T";

transmitting T" to at least one of the plurality of distributed processing system nodes and executing a join between T" and L".

11. The computer program product of claim 9, further comprising:

based on determining that the size of L" is less than the size of T' and that the size of L" is less than the parallel database broadcast threshold, transmitting L" to at least one of a plurality of parallel database nodes and executing a join between T' and L".

12. The computer program product of claim 9, further comprising transmitting T' to at least one of a plurality of distributed processing system nodes and executing a join between T' and L".

13. The computer program product of claim 9, further comprising:

based on determining that the estimated join-key selectivity $S_{L'}$ of the filtered data L' is not less than a first threshold function based on a number of records in T', a number of records in L' and the size of L':

transmitting T' to at least one of a plurality of distributed processing system nodes and executing a join between T' and L'.

14. The computer program product of claim 8, wherein the distributed processing system is a Hadoop big data platform having one of a distributed file system and a shared file system.

15. A computer system for joining data across a parallel database and a distributed processing system, the computer program product comprising:

a processor configured for executing instructions to perform a method comprising:

receiving a query on data stored in the parallel database T and the data stored in distributed processing system L;

applying one or more local predicates $\sigma_T$ based on the query to data stored on the parallel database T to create a filtered data T';

applying one or more local predicates $\sigma_L$ based on the query to data stored on the distributed processing system L to create a filtered data L';

based on determining that a size of L' is less than a size of T' and that the size of L' is less than a parallel database broadcast threshold, one or more of the nodes of distributed processing system transmitting L' to the parallel database, and in response to receiving L', one or more nodes of the parallel database executing a join between T' and L'; and based on determining that a number of the nodes distributed processing system n multiplied by the size of T' is less than the size of L' and that the size of T' is less than a distributed files system transfer threshold, one or more of parallel database nodes transmitting T' to the distributed processing system and in response to receiving T', one or more nodes of the distributed processing system executing a join between T' and L'.

16. The computer system of claim 15, further comprising:

estimating a join-key selectivity $S_{L'}$ of the filtered data L' and a join-key selectivity $S_{L'}$ of the filtered data T';

based on determining that the join-key selectivity $S_{L'}$ of the filtered data L' is less than a first threshold function based on a number of records in T', a number of records in L' and the size of L':

computing a bloom filter $BF_{T'}$ on the filtered data T';

transmitting the bloom filter $BF_{T'}$ to at least one of a plurality of distributed processing system nodes;

applying the bloom filter $BF_{T'}$ on L' to create a set of results L".

17. The computer system of claim 16, further comprising:

based on determining that the join-key selectivity $S_{T'}$ of the filtered data T' is less than a second threshold function based on a number of records in L", the number of records in T' and the size of T':

computing a bloom filter $BF_{L'}$ on the set of results L";

transmitting the bloom filter $BF_{L'}$ to at least one of a plurality of parallel database nodes;

applying the global bloom filter $BF_{L'}$ on T' to create a set of results T";

transmitting T" to at least one of the plurality of distributed processing system nodes and executing a join between T" and L".

18. The computer system of claim 16, further comprising:

based on determining that the size of L" is less than the size of T' and that the size of L" is less than the parallel database broadcast threshold, transmitting L" to at least one of a plurality of parallel database nodes and executing a join between T' and L".

19. The computer system of claim 16, further comprising:

based on determining that the join-key selectivity $S_{L'}$ of the filtered data L' is not less than a first threshold function based on a number of records in T', a number of records in L' and the size of L':

transmitting T' to at least one of a plurality of distributed processing system nodes and executing a join between T' and L'.

20. The computer system of claim 15, wherein the distributed processing system is a Hadoop big data platform having one of a distributed file system and a shared file system.

* * * * *